United States Patent [19]

Müller et al.

[11] 4,242,127
[45] Dec. 30, 1980

[54] PROCESS FOR TREATING HYDROXIDE SLUDGE RESIDUES CONTAINING NONFERROUS METALS

[75] Inventors: Wolfgang Müller, Mannheim-Rheinau; Lothar Witzke, Brühl, both of Fed. Rep. of Germany

[73] Assignee: Th. Goldschmidt Ag, Essen, Fed. Rep. of Germany

[21] Appl. No.: 77,138

[22] Filed: Sep. 19, 1979

[30] Foreign Application Priority Data

Sep. 22, 1978 [DE] Fed. Rep. of Germany ....... 2841271

[51] Int. Cl.³ .................... C22B 15/08; C22B 19/22; C22B 23/04
[52] U.S. Cl. .................................. 75/99; 75/101 BE; 75/115; 75/117; 75/119; 75/120; 75/121; 423/24; 423/100; 423/139
[58] Field of Search ................. 75/99, 117, 119, 120, 75/121, 101 BE, 115; 423/24, 100, 139

[56] References Cited

U.S. PATENT DOCUMENTS

| | | | |
|---|---|---|---|
| 3,795,596 | 3/1974 | Kane et al. ................. | 75/119 X |
| 3,800,024 | 5/1974 | Forsell et al. ............... | 423/55 |
| 3,996,046 | 12/1976 | Hoffmann et al. ........... | 75/99 |
| 4,002,544 | 1/1977 | Heimala et al. ............. | 204/109 |
| 4,008,076 | 2/1977 | Junghanss et al. .......... | 75/115 X |
| 4,008,134 | 2/1977 | Thorsen .................... | 75/101 BE |
| 4,043,882 | 8/1977 | Skarbo et al. .............. | 204/106 |
| 4,094,668 | 6/1978 | Yannopoulos et al. ....... | 75/99 |
| 4,100,043 | 7/1978 | Chou et al. ................. | 423/24 X |
| 4,166,837 | 9/1979 | Gallacher et al. ........... | 423/100 X |

*Primary Examiner*—G. Ozaki
*Attorney, Agent, or Firm*—Toren, McGeady and Stanger

[57] ABSTRACT

A method for processing a hydroxide sludge residue to separate and recover the nonferrous metal values therefrom including the steps of (1) concentrating the residue and acidifying and heating the concentrated residue to produce a solution containing the nonferrous metal values;

(2) removing the copper from the solution by liquid-liquid extraction;

(3) separating the chromium, aluminum, residual portions of iron, as well as the remaining calcium from the copper-free solution by high temperature pressure hydrolysis to obtain the metals as the hydrated oxides or basic sulfates;

(4) removing zinc and nickel from the remaining solution by liquid-liquid extraction;

(5) processing the individual nonferrous metal fractions to isolate and recover the metal values in a conventional manner.

By using this process, the nonferrous metal values can be easily separated in a relatively high state of purity from the hydroxide sludge wastes.

9 Claims, 1 Drawing Figure

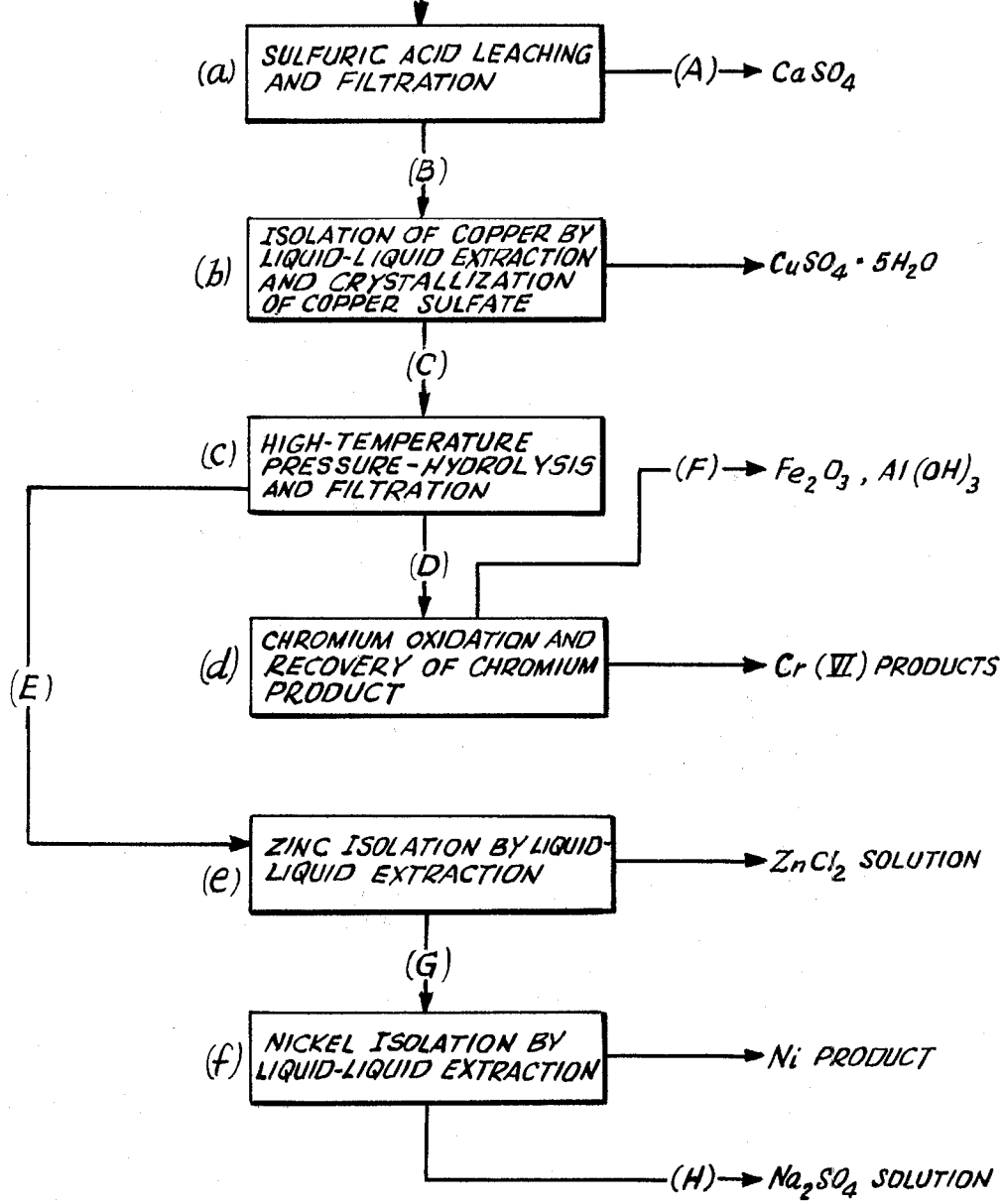

PROCESS FOR TREATING HYDROXIDE SLUDGE RESIDUES CONTAINING NONFERROUS METALS

BACKGROUND OF THE INVENTION

1. Field of the Invention

The invention relates to the process for working up hydroxide sludge residues from nonferrous metals, which essentially contain chromium, copper, zinc, and nickel as nonferrous metals, with recovery of the nonferrous metals by separating the nonferrous metals from one another.

2. Description of the Prior Art

Hydroxide sludge residues, such as are obtained from galvanic processes and in the nonferrous metal processing industry, essentially contain the following components (all data is in weight percent):

| Water | 40 to 90, | average: | 70 |
|---|---|---|---|
| Iron | 0 to 10, | average: | 2 |
| Aluminum | 0 to 2, | average: | 0.5 |
| Chromium (III) | 0 to 10, | average: | 2. |
| Zinc | 0 to 10, | average: | 2 |
| Copper | 0 to 5, | average: | 1 |
| Nickel | 0 to 5, | average: | 1 |
| Calcium | 0 to 20, | average: | 4 |
| Sodium | 0. to 2, | average: | 0.5 |
| Silica | 0 to 5, | average: | 1 |
| Cyanide (complex) | 0 to 0.1, | — | |
| Sulfite | + | — | |
| Carbonate | 0 to 5, | — | |
| Chloride | + | — | |
| Sulfate | + | — | |
| Fluoride | + | — | |

These hydroxide sludge residues contain large amounts of water and such low percentages of valuable metals, that smelting of the residues cannot be carried out economically. As waste materials, however, they contaminate the environment and can be deposited only in special garbage dumps which is economically very expensive. For this reason, at least a clean removal or destruction of the waste is necessary. It is more desirable to work up the waste so as to recover the contents.

It has been proposed to eradicate such waste by admixing it with other materials and using the admixture in the manufacture of bricks. Moreover, process methods are known from hydrometallurgy and from waste water treatment which permit the recovery of one or two, but hardly more, of the components. However, the method of recovery is unsatisfactory.

There are furthermore numerous procedures for separating metals in fixed-bed ion exchangers or for removing them from effluent solutions. In this case, however, selective separation of the valuable nonferrous metals is not achieved. Generally, mixed solutions are obtained which are precipitated together, the resultant residue having to be removed as waste sludge.

A process for recovering copper and zinc from nonferrous scrap is known from German Offenlegungsschrift No. 23 40 399. According to this process, the sludge is leached with an ammonium carbonate solution in the presence of oxygen. Subsequently, the metals are separated from the copper ammonium carbonate or zinc ammonium carbonate containing leach solution. Such a process cannot be used for working up hydroxide sludge residues from nonferrous metals, since the calcium content interferes with the ammonium/ammonium carbonate equilibrium and moreover, because the chromium hydroxide would remain in the residue.

The recovery of copper and nickel by liquid-liquid extraction from ammoniacal solutions is also known as is the liquid-liquid extraction of copper at pH values of 1 to 3. These processes generally operate in conjunction with an electrolysis whose end electrolyte is used for stripping the metal-laden organic phase. There are also processes for extracting zinc with organic liquids from zinc-containing solutions of sulfuric acid. It is a common feature of all the extraction processes described that the separation can only be carried out in the absence of the accompanying elements iron, calcium, aluminum and chromium.

Attempts to precipitate nonferrous metals selectively from the waste sludge have failed because of the coprecipitation of considerable amounts of accompanying elements.

BRIEF DESCRIPTION OF THE DRAWING

The drawing is a schematic diagram of a process in accordance with the present invention.

SUMMARY OF THE INVENTION

Applicants have discovered an economical method for recovering individual nonferrous metals, such as, chromium, copper, zinc and nickel, in separate and sequential manner and in a relatively high state of purity, from the collected nonferrous metal hydroxide sludge waste. This is accomplished by the combination of the following consecutive processing steps:

(a) the residue is mixed with water (worked up) to produce an aqueous suspension with 15 to 20 weight percent of solids, this suspension is treated with concentrated (ca. 96%) sulfuric acid at pH values equal to or less than 2 and temperatures of 10° to 70° C. for 0.5 to 2 hours, and then the acid-insoluble residue obtained is separated;

(b) the copper from this solution is isolated by liquid-liquid extraction using conventional procedures and the copper-free solution is worked up further as follows:

(c) the aluminum-III, iron-III, chromium-III and calcium portions as the hydrated oxides or basic sulfates are precipitated at pH values of 0.8 to 3, and temperatures of 150° to 260° C. under a pressure 6 to 48 bar, if necessary, with the addition of an oxidizing agent or by increasing the oxygen partial pressure for 1 to 3 hours, and then rapidly cooling the reaction mixture and subsequently neutralizing the resultant suspension with conventional neutralizing agents to obtain an insoluble hydrolysate ($c_1$) and a neutralized solution ($c_2$);

(d) alkali hydroxide and/or alkali carbonate is mixed with residue ($c_1$) (hydrolysate) from step (c) in at least stoichiometric amounts, based on the chromium content of the hydrolysate sludge. The mixture is dried at temperatures less than 200° C. and the dry mass is roasted with the addition of air at temperatures from 400° to 800° C. or with the addition of oxygen at 200° C. to 400° C. for 0.5 to 3 hours. The hot roasted material is then added to water, the water-insoluble residue is leached out and the alkali chromate formed is isolated by filtration;

(e) the zinc is isolated by liquid-liquid extraction from the neutralized solution ($c_2$) obtained in process step (c); and (f) the nickel is isolated from the remaining solution by liquid-liquid extraction.

Thereafter, the individual nonferrous metal fractions obtained in process steps (b), (d), (e) and (f) are worked up by known procedures.

DESCRIPTION OF THE PREFERRED EMBODIMENTS

This combination of process steps of the present invention achieves the separation of components, such as, calcium sulfate, a large portion of the iron and especially of the silica, which interferes with the following steps.

The sulfuric acid filtrate, obtained after the separation of these residues, contains, among others, the dissolved portions of copper, chromium, zinc and nickel which are to be recovered. The subsequent liquid-liquid extraction of copper is carried out before the separation of the chromium and the other trivalent metals from the bivalent metals, such as, zinc and nickel, which is described in the next step of the process. Otherwise, a portion of the copper would be precipitated as the hydrolysate and would not be recoverable.

In the step of the process which follows the separation of the copper, the trivalent metals, chromium, aluminum and residual portions of iron-III, are separated from the bivalent metals, such as, zinc and nickel by the so-called high-temperature pressure hydrolysis. At the same time, the calcium is coprecipitated as the anhydride. After treating the sulfuric acid solution at the appropriate temperature and under the appropriate pressure, chromium, iron and aluminum precipitate as their hydroxides or basic sulfates. Zinc and nickel remain in the solution.

This procedure enables excellent separation between the trivalent and divalent metals to be achieved in an acidic medium. The separation is all the more quantitative, the more rapidly the reaction mixture is cooled from the reaction temperature to a temperature between 120° to 100° C. This can be achieved by rapidly releasing the pressure as the suspension is brought out of the pressure vessel so that the latent heat is released by evaporation. At the same time, the reaction mixture is concentrated.

In addition, excellent filtration properties are achieved. The precipitated components are present in the microcrystalline state and can be filtered rapidly and without difficulty. It has proven to be advisable to supply oxygen during the high-temperature pressure hydrolysis or to add a different oxidizing agent prior to the filtration in order to keep iron in the more easily separable trivalent form.

The conversion of the trivalent chromium (present in the hydrolysate, i.e., residue, obtained after the high-temperature pressure hydrolysis) into the selectively separable hexavalent form by oxidative digestion with alkali and roasting in the presence of air or oxygen, has proven to be very economical. However, the conventional oxidizing agents, such as, hydrogen/peroxide, chlorine, etc., also lead to the hexavalent form.

After neutralizing the sulfuric acid solution, which has been freed from chromium, zinc and then nickel are isolated by liquid-liquid extraction. The previous separation of chromium is advantageous, because any chromium remaining in trivalent form would interfere with the liquid-liquid extraction of zinc and nickel. For the same reason, it has previously not been possible to work up the residues from galvanizing under acidic conditions.

After the liquid-liquid extraction of zinc and the recovery of a zinc chloride concentrate, a pure nickel salt solution is finally obtained in highly concentrated form by liquid-liquid extraction. A sodium sulfate containing solution is left behind.

German Pat. No. 26 21 144 discloses a process for working up nonferrous metal hydroxide sludge waste in which the aqueous sludge suspension of waste is first chlorinated in order to oxidize the trivalent chromium. Subsequently, the hexavalent chromium is separated out in a fixed bed anion exchanger. In the following steps, copper, zinc, and after precipitating and removing the aluminum, nickel are obtained in this sequence.

A proven disadvantage of this provess is that the chlorination and oxidation of the chromium to the hexavalent form, which takes place in the first step of the process, consumes too much alkali. Furthermore, the chloride content of the solution becomes so high that the continuation of the process is difficult and, in addition, the effluent water is contaminated.

According to this process, it is also necessary to use a fixed bed anion exchanger in order to separate out the hexavalent chromium. The difficult separation of precipitated aluminum and iron hydroxides in steps 1(a) and 1(d) interferes with the process shown in this patent.

In contrast, iron and aluminum precipitate completely and in a more filterable form using the process of the present invention. At the same time, surprisingly, chromium is precipitated in its trivalent form. As a result, the recovery of the chromium portion and the subsequent separation of zinc and nickel is facilitated considerably.

In accordance with the inventive process, the moist nonferrous metal hydroxide residue used is converted into a form in which it can be stirred readily by the addition of water. For this purpose, the solids content of this suspension should be 15 to 25 weight percent. This suspension is now treated with a conventional commercial sulfuric acid (ca.96%) in such a manner, that a final pH value of 1 to 2 is reached. The heat of neutralization is utilized to raise the temperature to ca. 70° C. Dissolved sulfates of copper, nickel, zinc and chromium are formed by this treatment with sulfuric acid. At the same time, calcium and a portion of the trivalent iron are converted into insoluble compounds. Moreover, insoluble silica is obtained.

The soluble and insoluble components are now separated from each other by filtration, which proceeds at a very good rate. The insoluble residue, consisting mainly of the already mentioned sulfates and of silica, may be discarded. In process step (b), which now follows, the copper is separated from the sulfuric acid filtrate by liquid-liquid extraction.

As used herein, liquid-liquid extraction is understood to mean the exchange of metal ions or hydrogen ions between two immiscible liquid phases, one of which is an aqueous phase and the other an organic solvent phase with an ion-specific extraction agent. Well known and conventional extraction agents, such as, for example, a dilution of substituted hydroxy-benzo-phenoximes with kerosene are suitable for the separation of copper by such a liquid-liquid extraction carried out in the following manners.

The pH value of the aqueous phase should be kept between 0.5 and 2.5. The acidic solution of metal salts may have a copper content of up to 20 g/l. The accompanying elements, such as zinc, nickel, chromium-III, iron-III and aluminum do not interfere, even if present at the same concentration. The copper content of the aqueous phase (raffinate) can be reduced to values below 0.01 g/l in three to five mixer-settler steps, depending on the initial concentration.

The term mixer-settler is understood to refer to a piece of equipment, generally consisting of two parts, in the first part of which mixing of the inorganic and organic phases takes place while in the second the two phases separate. Mixing promotes the intimate contact of the liquid phases for the desired exchange of material. If the extraction is to be largely quantitative, it is necessary to have several mixer-settler steps in sequence. At the same time, it is appropriate to have the aqueous and organic phases move counter currently.

Subsequently, the organic phase is stripped in a three-stage mixer settler with dilute sulfuric acid (100 to 200 g of sulfuric acid per liter). A copper sulfate solution with more than 50 grams of copper per liter and less than 0.05 grams of foreign metals per liter and a regenerated organic phase with traces of copper are obtained. The copper salt solution obtained may be used, for example, for the production of cathode copper by a copper electrolysis or for the crystallization of copper sulfate.

After the copper is separated out, elements, such as, aluminum, residual iron and especially chromium, which interfere with the recovery of zinc and nickel which follows, are now separated out by high-temperature pressure hydrolysis. The sulfuric acid solution (pH 1 to 2), which contains the dissolved elements, such as, chromium, aluminum, iron, zinc and nickel, is subjected to temperatures of 150° to 260° C., preferably of 200° to 220° C., in a closed vessel at a pressure of 6 to 48 bars, preferably at 16–24 bars.

At the same time, it has been shown to be appropriate to carry out the treatment at this temperature and pressure with the addition of a suitable oxidizing agent or while feeding oxygen, in order to obtain iron in the trivalent form, which is then readily separated out. When this high-temperature pressure hydrolysis is completed, the elements chromium, aluminum and iron have precipitated as the hydrated oxides or the basic sulfates in a form which is readily filtered. Bivalent elements which are still to be recovered, such as, zinc and nickel, as well as sodium remain in solution.

The nickel and zinc containing solution has become so strongly acidic because of the free sulfuric acid which is released in the course of the high-temperature pressure hydrolysis that, for the subsequent isolation of zinc which cannot take place in a strongly acidic medium, it is advisable to adjust the suspension formed to a pH of 4 to 6 by the addition of conventional neutralizing agents. Alkali hydroxides, alkali carbonates, as well as zinc oxide or zinc carbonate are suitable as the neutralizing agents. This neutralization advisably takes place before the filtration of the hydrolysate with utilization of the higher temperature.

After decanting and filtering, the dissolved portions of the zinc and nickel are contained in the filtrate. All of the chromium to be recovered in the form of basic sulfates or hydrated oxides, as well as the residual iron and aluminum, are contained in the residue. Alkali hydroxides, preferably in concentrated aqueous solution, are added to this moist residue obtained after the high-temperature pressure hydrolysis.

For economic reasons, sodium hydroxide is preferably used. Sodium carbonate, in solid form, may also be mixed with the residue. The alkali hydroxide may also be formed in situ, e.g., from calcium hydroxide and alkali sulfate. The alkali hydroxides or alkali carbonates should be added in stoichiometric amounts, based on the chromium content of the hydrolysate sludge. However, a two-fold to four-fold excess has proven to be advantageous.

It is advisable now to dry the moist sludge mixture, in order to prevent too large an expenditure of energy during the following roasting. This drying takes place at temperatures below 200° C. and may deliberately be incomplete in order to avoid the formation of dust which may occur with complete drying.

The predried material is now subjected to roasting either at temperatures of 400° C. to 800° C., preferably at 500° to 700° C. for 0.5 to 3 hours with air being supplied simultaneously, or at temperatures of 200° to 400° C. in an oxygen atmosphere. In so doing, the trivalent portions of chromium are oxidized to the hexavalent stage.

The roasted material, still oven-hot, is added to water and leached with stirring for 1 to 2 hours at temperatures of 70° to 100° C. Subsequently, the warm suspension is filtered, e.g., with a vacuum filter, filtration rates of 1000–1,500 $l/m^2$ per hour being reached without having to add filter aids. After the usual washing, a dark-brown, moist residue is obtained which still contains 40 to 50% water and quantitatively corresponds to about 50 to 70% of the roasted material used in the leaching.

If the alkali is added in stoichiometric amounts, the filtrate obtained from the filtration of the roasted material, contains the majority of the chromium in the form of the alkali chromate and practically no aluminum. The alkali chromate can be reduced to trivalent chromium by known procedures with conventional reducing agents, such as, hydrogen, formaldehyde, etc. The precipitated chromium-III hydroxide is then isolated and can be used for further processing, e.g., to chromium oxide. The alkali hydroxide, obtained in this reduction reaction, is advisably recycled to the chromium roasting process step, where it is mixed in with fresh hydrolysis residue. Because of the reduction reaction, the alkali hydroxide used here is retained almost completely so that only the losses resulting, for example, from washing operations, need to be replaced.

As already mentioned above, it has proven to be advantageous to mix in with the chromium-containing hydrolysis residue the two-fold to four-fold amount of alkali hydroxide and/or alkali carbonate required. Such a procedure furthermore causes the aluminum present in the residue to be converted to the aluminate in the roasting which follows. Further, it causes the aluminate to be present in the filtrate as alkali aluminate in addition to the alkali chromate in the subsequent leaching with water and isolation of the isoluble residue.

Before or after the above-described reduction of chromium and isolation of the chromium-III hydroxide, the aluminum can then be precipitated and filtered off as the aluminum hydroxides, e.g., by the introduction of carbon dioxide. The alkali carbonate obtained here can also be recycled to the first step of the process.

The filtrate of the roasted material, which contains the alkali chromate, can also be converted to the alkali dichromate by acidifying with sulfuric acid and precipitating the alkali by concentrating. A further conversion with sulfuric acid may then be used for obtaining chromium-VI oxide.

The water insoluble residue obtained after leaching with water and subsequent filtration is now discarded. Apart from iron and possible aluminum, it contains only a little zinc and nickel in an acid-insoluble form.

After step (d) of the separation, zinc is isolated by liquid-liquid extraction from the solution which has been freed from chromium, aluminum, iron and copper. The aforementioned mixer-settler equipment is used for this purpose. The di-(2-ethylhexyl)-phosphoric acid, in dilution with kerosene, is particularly suitable as an extraction agent. After three to five mixer-settler stages, the zinc content in the raffinate is reduced to values below 0.01 g/l. At the same time, the pH of the inorganic, aqueous phase should be maintained at about 1 to 3. The organic phase which may contain 10 to 30 g/l of zinc depending on the di-(2-ethylhexyl)-phosphoric acid content, is stripped counter currentwise in three mixer-settler stages by a 20 to 30% hydrochloric acid solution. The stripping eluate has a zinc concentration greater than 200 g/l and can be used for the production of zinc chloride.

Admittedly, processes are known for recovering zinc from from relatively pure sulfate solutions or effluents or for extracting zinc as the chloro complex from solutions of high chloride content. However, it was not known how to extract zinc as well as nickel and sodium from sulfate solutions in such a way that stripping eluates may be obtained with a high content of zinc and practically an absence of heavy metals.

Nickel is now extracted by liquid-liquid extraction from the remaining alkali-sulfate-containing aqueous solution. A mixture of di-(2-ethylhexyl)-phosphoric acid and naphthenic acid, in conjunction with a highboiling aliphatic solvent, such as, kerosene, has proven to be suitable as an extraction agent. Moreover, a mixture of 1 to 10 volume parts of di-(2-ethylhexyl)-phosphoric acid and 3 to 10 volume parts of naphthenic acid are particularly useful.

A mixture of 3 to 7 volume parts of di-(2-ethylhexyl)-phosphoric acid and 10 to 20 volume parts of naphthenic acid, with kerosene as solvent, is preferred.

With the help of this mixture, it is possible to extract nickel from the aqueous mixture, nickel containing solution of high alkali salt content in 2 to 4 extraction stages with less than 5 minutes of contact time in the pH range of 6 to 7.5 to a residual nickel content of less than 1 mg/l. The organic phase, fully laden with nickel (10 to 20 grams of nickel per liter), is stripped in two mixer-settler stages by concentrated hydrochloric acid; or by a nickel chloride solution containing hydrochloric acid; or by dilute sulfuric acid; or a nickel sulfate solution containing sulfuric acid; or by solutions containing nitric acid; in such a manner, that highly concentrated solutions of nickel salt are directly obtained.

Solutions of nickel chloride, nickel sulfate or nickel nitrate are alternatively obtained, depending on the stripping acid used. These solutions or the salts which may be crystallized from them may be used directly in the electroplating industry for the purpose of nickel plating or for the restoration of catalysts.

High yields (98.5% to 99.5%) of the soluble nonferrous metals present in the hydroxide sludge waste are obtained by the inventive process. The solution which remains after the process contains only traces of these elements. As a result of the process of leaching and the associated isolation of nonferrous metallic elements, it is possible to reduce the amount of waste sludge (mainly gypsum) to a third of the original amount.

The following example illustrates the present invention. In the example, the letters in parenthesis (a) to (f) correspond to the individual steps of the process as set forth hereinabove, and the capital letters (A) to (H) refer to the material flows described in the drawing.

EXAMPLE

An electroplating sludge mixture (100 parts by weight) containing in weight percent: 68.4% of $H_2O$, 1.62% of Cr, 1.49% of Cu, 1.94% of Ni, 1.52% of Zn, 0.62% of Fe, 0.75% of Al, 1.20% of $SiO_2$ and 3.8% Ca, was intimately mixed with 60 parts by weight of water.

By addition of 23 parts by weight of a 96% sulfuric acid solution with stirring (a) within 30 minutes, a temperature of 70° C. and a pH of 1.5 were reached. Separation by filtration as well as a subsequent washing with 60 parts by weight of water resulted in 36 parts by weight of a moist residue (A) containing, in weight percent: 49% $H_2O$, 0.1% Cr, 0.05% Cu, 0.01% Ni, 0.01% Zn, 0.05% Al, 10.4% Ca, 1.1% Fe and 144 parts by weight of a filtrate (B) with a density of 1.16 g/cm³ and containing in g/l: 12.9 g Cr, 11.9 g Cu, 15.6 g Ni, 12.2 g Zn, 1.75 g Fe, 6.0 g Al, and 0.5 g Ca.

The filtration residue was discarded. The filtrate (B) of the sulfuric acid leaching (totaling 124 parts by volume was subjected to a solvent extraction step for the extraction of copper (b). A 20 volume percent solution of benzophenonoxime in kerosene having a low aromatics content (less than 0.1%) and boiling within the range of 192° C. to 254° C. was used as the extraction agent.

The equipment consisted of four mixer-settlers connected in series, each with a mixer space of 1 liter and a settling space of 4 liters. The rate of flow of the organic phase averaged 22.7 l/hour and that of the inorganic phase to be extracted was 8.2 l/hour. The copper concentration of the organic phase reached about 4.5 g/l, while the so-called raffinate (solution C), the aqueous stage phase extracted in four stages, contained 0.002 g/l of copper. Between stages 2 and 3, the pH of the aqueous phase was adjusted to 2.0 by the addition of sodium hydroxide.

For the purpose of stripping the copper, the copper-laden organic phase was brought into contact with 140 g/l of sulfuric acid at 40° C. in three equal, consecutive mixer-settler stages. In so doing, the copper content of the organic phase fell to 0.1 g/l and the copper content of the acid rose to 70 g/l. This so-called stripping eluate in addition contained 0.005 g/l of nickel, less than 0.001 g/l of aluminum, less than 0.001 g/l of zinc and 0.02 g/l of iron. After evaporating and cooling, practically pure $CuSO_4 \cdot 5H_2O$ crystallized out.

The raffinate solution (C) from the copper extraction contained chromium-III, aluminum and iron-III as well as practially the entire amount of zinc, nickel and sodium. Solution (C) which has a pH of 1.5, was heated without the addition of further chemicals in a pressure vessel for 1 hour to 220° C. at 24 bars (c).

By rapidly emptying the resulting suspension from the pressure vessel, the reaction mixture was cooled within 5 minutes, the temperature falling to the boiling point at atmospheric pressure as a result of the sudden release of pressure. The suspension, formed by the hydrolysis and having a pH of 0.8, was adjusted to a pH of 4.8 at 40° C. by sodium hydroxide. It was then filtered and the residue was washed. A specific filtration rate of 1,500 l/m²/hour was measured. A total of 9.6 parts by weight of moist sludge (D) with the following composition in weight percent was obtained: 48% H₂O, 16.5% Cr, 2.2% Fe, 7.7% Al, 0.9% Zn, 0.3% Ni, 0.1% Na and 130 parts by weight of filtrate (E) including wash water with a density of 1.15 g/l and containing in g/l: 0.005 g Cr, 0.01 g Fe, 0.01 g Al, 10.9 g Zn, 14.3 g Ni and 30.2 g Na.

The moist hydrolysis sludge (D) (8 parts by weight) was mixed with 9 parts by weight of a 50% solution of sodium hydroxide, dried and roasted for 2 hours at 600° C. (d).

The roasted material obtained (7.1 parts by weight) was leached with 18.6 volume parts of water at 80°–90° C. and treated with carbon dioxide until the pH of the solution was 9.5. After subsequent filtration and washing, the whole of the iron and aluminum remained in the residue (F) while the solution contained practically the whole of the chromium as sodium chromate, the sulfate as sodium sulfate and the excess sodium carbonate. It was possible to recover the chromium easily from this solution.

Altogether the following were obtained. 29 volume parts of solution containing in g/l: 139.6 g $Na_2CrO_4$, 162.5 g $Na_2SO_4$, 40.6 g $Na_2CO_3$ and 2.6 parts by weight of moist residue containing in weight percent: 59% H₂O, 1.0% Cr-III, 6.8% Fe, 23.7% Al, 0.9% Ni, 2.7% Zn. This residue can be discarded.

The filtrate (E) from the high-temperature pressure hydrolysis was now used for the recovery of zinc, as well as, nickel and sodium. For the purpose of isolating zinc, this filtrate (E) was treated in four mixer-settler stages (constructed as for copper) with an extraction solution of 20 volume percent of di-(2-ethylhexyl)-phosphoric acid in kerosene having a low aromatics content (less than 0.1%) and boiling in the range of 192° to 254° C. (e). The flow rate of the inorganic phase was 8.0 l/hour and that of the organic phase 10.0 l/hour. Finally, a zinc-laden phase, containing ca. 8.7 g/l of zinc, was obtained.

After the second extraction stage, the pH of the aqueous solution was adjusted to 3.0 by the addition of sodium hydroxide. After the fourth stage, 0.01 g/l of zinc could be detected in the "zinc-free" raffinate (G). For the purpose of stripping the zinc from the zinc-laden organic phase, the latter was treated in three mixer-settler stages with a 30 weight percent solution of hydrochloric acid. In so doing, the zinc content of the organic phase fell to ca. 0.1 g/l and the zinc content of the eluate reached 240 g/l. No nickel or sulfate could be detected in the zinc stripping eluate.

The raffinate of the zinc extraction (G), which now contained only nickel and sodium sulfate, was subjected to a third solvent extraction step, also at a flow rate of 8 l/hour, for the purpose of isolating the nickel (f). This solvent extraction consisted of four stages as was the case for the preceding metals. A mixture of 5 volume percent of di-(2-ethylhexyl)-phosphoric acid and 15 volume percent of naphthenic acid in a kerosene with a boiling range of 192° to 254° C. was used as the extraction agent.

In so doing, the pH of each stage was kept at 6.5 by the addition of sodium hydroxide. The flow rate of the organic phase was ca. 6.0 l/hour. After three stages, the nickel content of the organic phase adjusted to 19.1 g/l, while the nickel raffinate contained less than 0.01 g/l of nickel and the sodium sulfate formed in the extraction (H). In order to recover the nickel, the nickel-laden organic phase was also treated in 3 mixer-settler stages by stripping with 20 weight percent of nitric acid. At the same time, a 39 weight percent nickel nitrate solution was obtained.

What is claimed is:

1. A method for treating hydroxide sludge residues containing nonferrous metals selected from the group consisting of chromium, copper, zinc and nickel, and recovering the non-ferrous metals by the separation of the individual nonferrous metals from one another comprising the following consecutive steps:
   (a) concentrating the residue to an aqueous suspension with 15 to 20 weight percent of solids, treating this suspension with ca. 96% sulfuric acid at pH values equal to or less than 2 and temperatures of 10° to 70° C. for 0.5 to 2 hours, and separating the acid-insoluble residue obtained;
   (b) isolating the copper from this solution by liquid extraction and further processing the copper-free solution by
   (c) precipitating the aluminum-III, iron-III, chromium-III, and calcium portions as the hydrated oxides or basic sulfates by treating the copper-free solution at pH values of 0.8 to 3, temperatures of 150° to 260° C., under a pressure of 6 to 48 bars for 1 to 3 hours and rapidly cooling the reaction mixture, and then subsequently neutralizing the resultant suspension with conventional neutralizing agents to produce
   ($c_1$) an insoluble hydrolysate and
   ($c_2$) a neutralized solution,
   (d) mixing an alkali hydroxide and/or alkali carbonate with insoluble hydrolysate ($c_1$) in at least stoichiometric amounts, based on the chromium content of the hydrolysate sludge, drying the mixture at temperatures less than 200° C. and roasting the dry mass with the addition of air at temperatures from 400° to 800° C. or with the addition of oxygen at 200° to 400° C. during 0.5 to 3 hours and subsequently adding the hot roasted material to water, leaching out the water-insoluble residue and then isolating the alkali chromate formed by filtration;
   (e) isolating the zinc by liquid-liquid-extraction from the neutralized solution ($c_2$);
   (f) isolating the nickel from the remaining solution by liquid-liquid extraction;
and processing the individual nonferrous metal fractions to isolate the metals obtained in process steps (b), (d), (e), and (f) by conventional procedures.

2. The method of claim 1 wherein during step (c), an oxidizing agent is added to the copper-free solution.

3. The method of claim 1 wherein during step (c), the oxygen partial pressure is increased.

4. The method of claims 1, 2, or 3, wherein temperatures of 200° to 220° C. and pressures of 16 to 24 bars are used in process step (c).

5. The method of claims 1, 2, or 3, wherein the rapid cooling in process step (c) is carried out by removing the reaction mixture from the pressure vessel by releasing the pressure.

6. The method of claims 1, 2, or 3, wherein the dilutions of substituted hydroxy-benzophenonoxines with kerosene are used as extraction agents in process step (b).

7. The method of claims 1, 2, or 3, wherein di-(2-ethylhexyl)-phosphoric acid, diluted with kerosene, is used as an extraction agent in process step (e).

8. The method of claims 1, 2, or 3, wherein a mixture of di-(2-ethylhexyl)-phosphoric acid and naphtnenic acid, diluted with kerosene is used as extraction agent in process step (f).

9. The method of claims 1, 2, or 3, wherein a mixture of 1 to 10 parts by volume of di-(2-ethylhexyl)-phosphoric acid and 3 to 30 parts by volume of naphthenic acid, diluted with kerosene is used as the extraction agent in process step (f).

* * * * *